United States Patent
Wu et al.

(10) Patent No.: US 7,556,512 B2
(45) Date of Patent: Jul. 7, 2009

(54) MEMORY DISK

(75) Inventors: Chih-Hsin Wu, Taipei (TW);
Chih-Yung Chi, Taipei (TW);
Kun-Chin Chiu, Taipei (JP)

(73) Assignee: Asustek Computer Inc., Peitou, Taipei (TW)

( * ) Notice: Subject to any disclaimer, the term of this patent is extended or adjusted under 35 U.S.C. 154(b) by 0 days.

(21) Appl. No.: 12/040,092

(22) Filed: Feb. 29, 2008

(65) Prior Publication Data

US 2008/0220648 A1    Sep. 11, 2008

(30) Foreign Application Priority Data

Mar. 7, 2007    (TW) .............. 96107928 A

(51) Int. Cl.
*H01R 13/44*    (2006.01)
(52) U.S. Cl. ........................... 439/135; 439/483
(58) Field of Classification Search ......... 439/135–144, 439/483–484, 528
See application file for complete search history.

(56) References Cited

U.S. PATENT DOCUMENTS

| | | | |
|---|---|---|---|
| 6,381,142 B1 | 4/2002 | Hasegawa | |
| 6,456,500 B1* | 9/2002 | Chen | 361/752 |
| 6,926,544 B2* | 8/2005 | Lee | 439/147 |
| 6,932,629 B2* | 8/2005 | Ikenoue | 439/138 |
| 7,104,814 B1* | 9/2006 | She et al. | 439/131 |
| 7,361,034 B1* | 4/2008 | Chiu et al. | 439/131 |
| 7,500,858 B2* | 3/2009 | Emerson et al. | 439/136 |
| 2006/0234533 A1* | 10/2006 | Lei et al. | 439/135 |

* cited by examiner

*Primary Examiner*—Tho D. Ta
*Assistant Examiner*—Larisa Tsukerman
(74) *Attorney, Agent, or Firm*—Thomas, Kayden, Horstemeyer & Risley

(57) ABSTRACT

A memory disk structure includes a storage device, a hollow casing, an elastic member and a base. The storage device has a connector and a main body. The connector is installed in one end of the main body. The hollow casing has an opening and a recess with a protrusion. The elastic member and the base are attached to the main body, and the base has an engagement portion. When the connector passes through the opening of the hollow casing to make connector pushed into the hollow casing, the elastic member is deformed to make the engagement portion wedge in the recess and against the protrusion, and when the body is pushed into the hollow casing and the connector is exposed outside the hollow casing, the elastic member is fastened at the first recess to prevent the storage device from departing from the hollow casing.

9 Claims, 3 Drawing Sheets

MEMORY DISK

RELATED APPLICATIONS

This application claims priority to Taiwan Application Serial Number 96107928, filed Mar. 7, 2007, which is herein incorporated by reference.

BACKGROUND OF THE INVENTION

1. Field of the Invention

The invention relates to a storage device and, more particularly, to a memory disk.

2. Description of the Related Art

With the rapid development of the technology about the flash memory, a flash memory with a large capacity has been largely used in a storage device. Especially, the product such as the memory disk or thumb disk on the market has made the size of the storage device minimized by using the flash memory with a larger capacity.

The universal serial bus (USB) is commonly used as the interface of a memory disc. The casing of the memory disc usually includes a cover covering the USB connector which is not in use to prevent the dust from going inside.

However, when the memory disk is in use (for example, the USB connector is inserted into the connector of the computer), the cover may be casually placed near the computer. Since the size of the cover of the memory disk is smaller, the cover may be easily lost. Once the cover of the memory disk is lost, the USB connector will lose the function of preventing the dust.

BRIEF SUMMARY OF THE INVENTION

One objective of the invention is to provide a memory disk for users to carry and use easily.

According to the objective of the invention, a memory disk is provided. The structure of the memory disk includes a storage device, a hollow casing, an elastic member and a base. The storage device has a connector provided at one end of the storage device and a body. The hollow casing has an opening and a recess, and the recess has a protrusion. The elastic member is attached to the body. The base is attached to the elastic member and the base has an engagement portion. When the connector passes through the opening of the hollow casing to make the connector pushed into the hollow casing, the elastic member is deformed to make the engagement portion wedge in the recess and against the protrusion. When the body is pushed into the hollow casing, and the connector is exposed outside the hollow casing, the elastic member is similarly fastened at the recess to prevent the storage device from departing from the hollow casing.

BRIEF DESCRIPTION OF THE DRAWINGS

These and other features, aspects, and advantages of the present invention will become better understood with regard to the following description, appended claims, and accompanying drawings.

DETAILED DESCRIPTION OF THE EMBODIMENTS

The invention provides a memory disk which users can carry and store conveniently and provides a dust prevention function for the connector.

Figure 1:
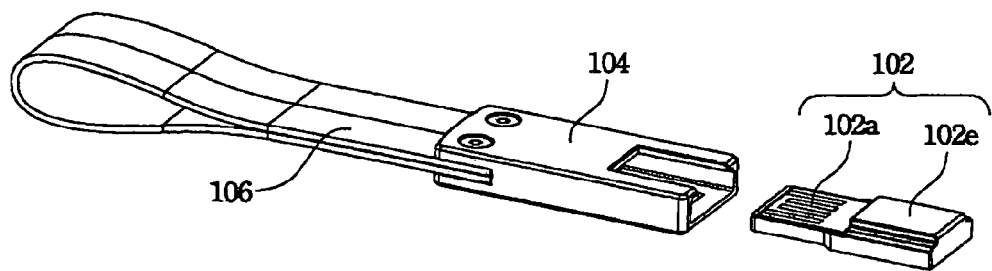
FIG. 1 is a top view of a memory disk according to an embodiment of the invention.
Figure 2:
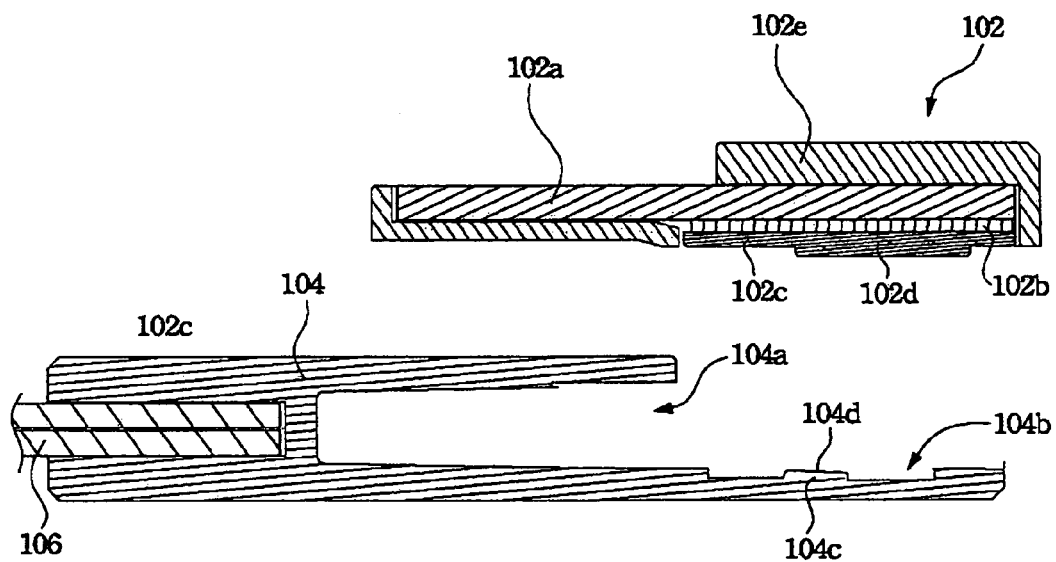
FIG. 2 is a section diagram of the memory disk according to the embodiment of the invention.

Please refer to FIG. 1 and FIG. 2, which show a memory disk 100. FIG. 2 is a section diagram of a memory disk according to an embodiment of the invention. The memory disk 100 includes a hollow casing 104 and a storage device 102. The memory disk 100 further includes a strap 106 for users to carry and story easily.

The storage device 102 has a connector 102a and a body 102e. The connector 102a is provided at one end of the storage device 102. The connector 102a (such as a universal serial bus (USB) connector) is used to insert to a corresponding connector slot (such as a connector slot of a computer), so that the body 102a can be read or be used to store data. The elastic member 102b and the base 102c are attached to the body 102e. The base has an engagement portion 102d. The elastic member 102b is posited between the body 102e and the base 102c. When the base 102c is pressed to deform the elastic member, the engagement portion 102d wedges in the recess and against the protrusion. The hollow casing 104 has an opening 104a. The lengths of the sections of the hollow casing at the two sides of the opening 104a are unequal, and the section which is longer has a recess 104b. The area of the recess 104b has a protrusion. The storage device 102 and the hollow casing 104 can be assembled or separated from each other according to the usage state.

The storage device 102 may including a IC (integrated circuit) printed circuit board. The IC printed circuit board has a memory chip (within the body). One end of the IC printed circuit board is exposed outside the body to be the connector 102a. The memory chip may be a nonvolatile memory (such as a flash memory).

Figure 3:
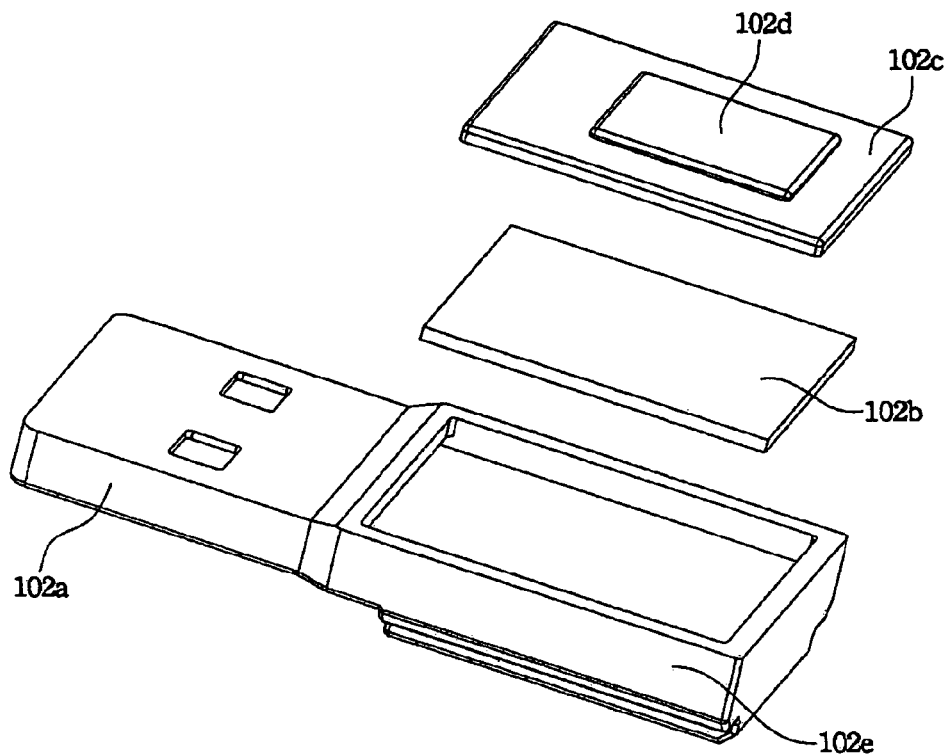
FIG. 3 shows the mode of separating the storage device of the memory disk of the invention from the hollow casing.

Please refer to FIG. 3 showing the mode of separating the storage device of the memory disk of the invention from the hollow casing. The elastic member 102b is attached on the recess of the body 102e and the base 102c is attached on the elastic member 102b.

Figure 4:
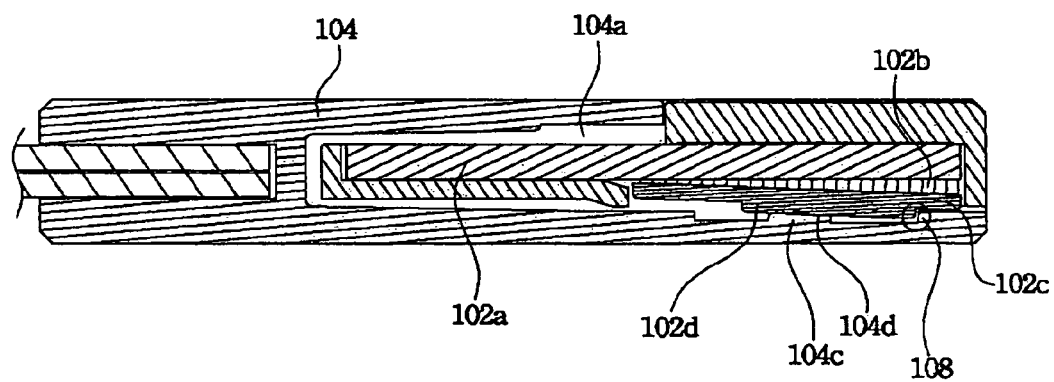
FIG. 4 is a sectional exploded diagram showing a memory disk not in use according to an embodiment of the invention.

Please refer to FIG. 4. When the storage device 102 is not in use (for example, the body 102e is not used to read or store data), the connector 102a is received in the hollow casing 104. The connector 102a passes through the opening 104a of the hollow casing 104 to make the connector 102a pushed into the hollow casing 104, the elastic member 102b is deformed to make the engagement portion 102d wedge in the recess 104b and against the protrusion 104c. The protrusion 104c has an inclined plane according to the bottom face of the protrusion 104c. When the elastic member 102b contacts with the engagement portion, the engagement portion 102d wedges in the recess 104b and against the protrusion 104c by the inclined plane (show in 108). The engagement portion 102d is fastened in the recess 104b to prevent the storage device 102 from departing from the hollow casing 104. Users also can carry it conveniently through the strap 106.

Figure 5:
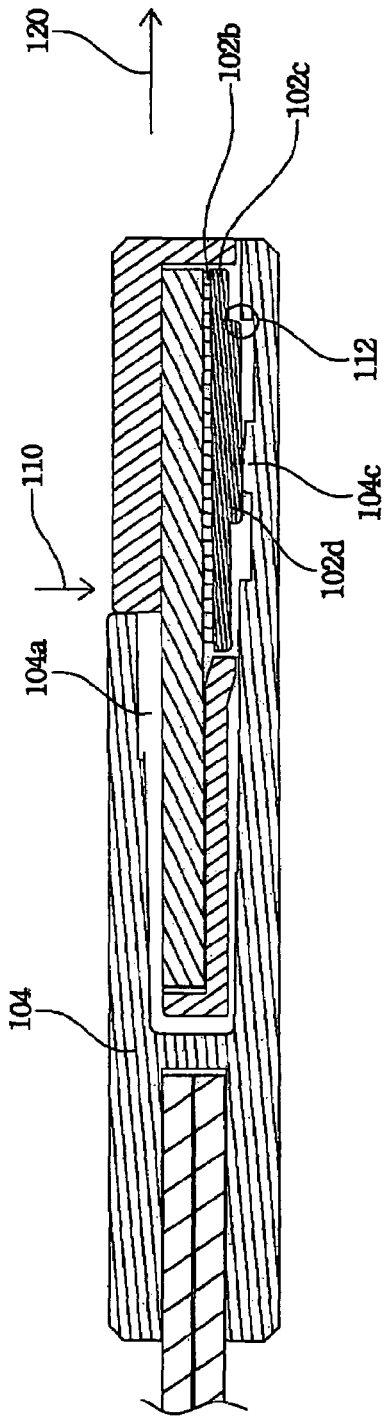
FIG. 5 is a section diagram showing a memory disk in a usage state according to an embodiment of the invention.

Please refer to FIG. 5. When the storage device 120 needs to depart from the hollow casing 104, a user may press the storage device 120 along the direction 110, and then the engagement portion 102d departs from the recess 104b by pivoting on the protrusion 104c (show in 112). Then, the user can pull the storage device 102 out of the hollow casing 104 along the direction 120. The connector 102a of the storage device 102 can be inserted to a corresponding connector slot.

Figure 6:
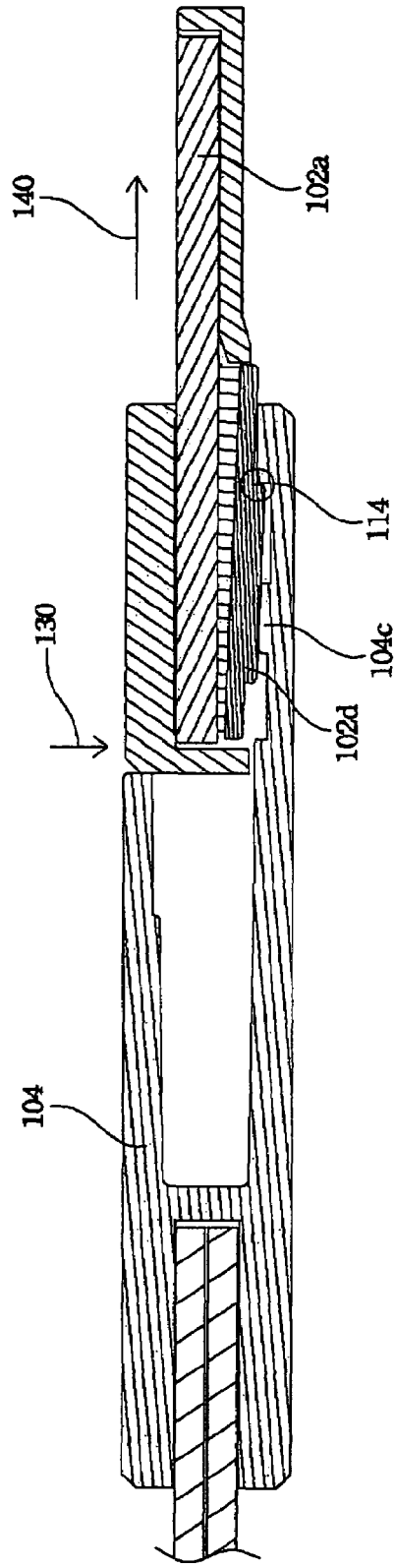
FIG. 6 is a sectional exploded diagram showing a memory disk in use according to another embodiment of the invention.

Please refer to FIG. 6. When the connector 102a of the storage device 102 is inserted to a corresponding connector slot, the storage device 102 can be assembled with the hollow casing 104 in another manner. The difference between this manner and the manner shown in FIG. 4 is that the connector 102a of the storage device 102 is outside the hollow casing 104. When the body 102e is push into the hollow casing 104, the elastic member 102b is deformed to make the engagement portion 102d wedge in the recess 104b and against the protrusion 104c (show in 114) to prevent the storage device from departing from the hollow casing. The user may press along the direction 130, and pull the storage device 102 out of the hollow casing 104 along the direction 130 to depart the body 102e from the hollow casing.

From the embodiment of the invention, a user can carry the memory disk of the invention easily through the strap, and the hollow casing can provide the dust proof function for the connector and the function of preventing the storage device from being lost.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A memory disk comprising:
 a storage device having a connector provided at one end of the storage device and a body;
 a hollow casing having an opening and a recess with a protrusion, the storage device being suitable to be pushed into the hollow casing through the opening;
 an elastic member fixed at the body; and
 a base attached to the elastic member and having an engagement portion, wherein when the connector passes through the opening of the hollow casing to make connector pushed into the hollow casing, the elastic member is deformed to make the engagement portion wedge in the recess and against the protrusion, and when the body is pushed into the hollow casing and the connector is exposed outside the hollow casing, the elastic member is fastened at the first recess to prevent the storage device from departing from the hollow casing.

2. The memory disk according to claim 1, wherein the protrusion has an inclined plane according to the bottom face of the protrusion, wherein when the elastic member contacts with the engagement portion, the engagement portion wedges in the recess and against the protrusion by the inclined plane.

3. The memory disk according to claim 1, wherein the lengths of the sections of the hollow casing at the two sides of the first opening are unequal, and the second recess is located at the side where the longer section is provided.

4. The memory disk according to claim 1 further comprising a strap connected to the hollow casing.

5. The memory disk according to claim 1, wherein the connector is a universal serial bus (USB) connector.

6. The memory disk according to claim 1, wherein the storage device including an IC printed circuit board, one end of the IC printed circuit board being exposed outside the body to be the connector.

7. The memory disk according to claim 6, wherein the IC printed circuit board has a memory chip.

8. The memory disk according to claim 7, wherein the memory chip is a nonvolatile memory.

9. The memory disk according to claim 8, wherein the nonvolatile memory is a flash memory.

\* \* \* \* \*